United States Patent
Lee et al.

(10) Patent No.: US 7,369,876 B2
(45) Date of Patent: May 6, 2008

(54) APPARATUS AND METHOD FOR ESTIMATING A VELOCITY OF A MOBILE STATION IN A MOBILE COMMUNICATION SYSTEM

(75) Inventors: Ji-Ha Lee, Seoul (KR); Seung-Hyeon Nahm, Yongin-si (KR); Seung-Joo Maeng, Seongnam-si (KR); Sung-Kwon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 10/795,982

(22) Filed: Mar. 10, 2004

(65) Prior Publication Data

US 2004/0180697 A1 Sep. 16, 2004

(30) Foreign Application Priority Data

Mar. 10, 2003 (KR) ...................... 10-2003-0014685

(51) Int. Cl.
*H04B 1/38* (2006.01)
(52) U.S. Cl. ...................... 455/561; 455/441; 455/440; 455/522; 455/67.11
(58) Field of Classification Search ................ 455/561, 455/238.1, 441, 551, 440, 404.2, 456.1, 522, 455/69, 67.11
See application file for complete search history.

(56) References Cited

U.S. PATENT DOCUMENTS

| | | | | |
|---|---|---|---|---|
| 5,513,221 A | * | 4/1996 | Parr et al. | 375/344 |
| 6,006,245 A | * | 12/1999 | Thayer | 708/404 |
| 6,842,624 B2 | * | 1/2005 | Sarkar et al. | 455/522 |

FOREIGN PATENT DOCUMENTS

| | | |
|---|---|---|
| JP | 2002-320277 | 10/2002 |
| JP | 2003-023395 | 1/2003 |

* cited by examiner

*Primary Examiner*—Melur Ramakrishnaiah
(74) *Attorney, Agent, or Firm*—Roylance, Abrams, Berdo & Goodman L.L.P.

(57) ABSTRACT

A base station apparatus and method for estimating a velocity of a mobile station in a mobile communication system are provided. In the apparatus and 9 method, a channel estimator receives a signal on a radio channel from the mobile station and performs channel estimation using the received signal. A velocity estimator detects a power spectrum value of the channel estimator, and provides the channel estimator with a channel estimation coefficient for use during channel estimation according to a Doppler shift frequency value of power estimated from the mobile station when the velocity of the mobile station is unchanged.

12 Claims, 9 Drawing Sheets

APPARATUS AND METHOD FOR ESTIMATING A VELOCITY OF A MOBILE STATION IN A MOBILE COMMUNICATION SYSTEM

PRIORITY

This application claims priority under 35 U.S.C. § 119 to an application entitled "Apparatus and Method for Estimating Velocity of Mobile Station in a Mobile Communication System" filed in the Korean Intellectual Property Office on Mar. 10, 2003 and assigned Serial No. 2003-14685, the contents of which are incorporated herein by reference.

BACKGROUND OF THE INVENTION

1. Field of the Invention

The present invention relates generally to an apparatus and method for estimating a velocity of a mobile station, and in particular, to an apparatus and method for estimating a velocity of a mobile station in a mobile communication system.

2. Description of the Related Art

Mobile communication systems have been developed to provide mobility to end users via mobile stations. In order to provide mobility to mobile stations, mobile communication systems establish channels between a base station and a mobile station and perform voice and data communications through the established channels. Being mobile, mobile stations can transmit radio frequency signals at different positions and are not limited to a fixed position. Therefore, environments and paths of radio channels are subject to incessant change. In addition, because a mobile station moves with its user, it transmits radio signals when the user is nonmobile or moving at either a low or high speed.

In such a mobile communication system, due to a change in channel environments and movement of mobile stations, transmission paths of radio signals are subject to change. Therefore, a base station of the mobile communication system must receive data by taking the velocity of mobile stations into consideration. That is, the mobile communication system estimates a transmission channel of a mobile station by taking the above factors into account and extracts data according to the result of the estimation. Therefore, if the mobile communication system fails to perform correct channel estimation on a mobile station, it cannot extract correct data.

A description will now be made of channel estimation in a mobile communication system. The mobile communication system transmits data to a mobile station over a forward link transmitted from a base station to a mobile station. At this point, the mobile communication system transmits a pilot signal along with a traffic channel so that the mobile station can estimate a channel. That is, a mobile station transmits data to a base station over a reverse link. At this point, the mobile station transmits a reverse pilot signal so that the base station can estimate a reverse channel. Upon receiving a reverse pilot signal transmitted by the mobile station, the base station estimates a channel based on the received pilot signal. Further, the base station decodes traffic received from the corresponding mobile station based on the channel-estimated value, thereby improving data reception performance.

However, a reverse pilot channel and a reverse traffic channel suffer from Doppler shift according to the velocity of the mobile station. The Doppler shift effect may cause performance degradation on actual channel estimation. Performance degradation of channel estimation means that a traffic phase has a different value according to how much a received signal is shifted. In addition, the Doppler shift always has a different value according to the velocity of the mobile station. Therefore, in order to completely remove the Doppler shift effect, a base station must remove the Doppler shift effect for each of the possible velocities of the mobile station. Because the base station must remove the Doppler shift effect for all possible velocities of the mobile station and perform channel estimation, the base station needs channel estimators for respective velocities in order to perform both of the two operations.

A method used to estimate the velocity of a mobile station in an actual mobile communication system will now be described. In the existing mobile communication system, velocities of a mobile station are divided into several velocity bands and channel estimators exhibiting the best channel estimation performance at corresponding velocity bands are pre-designed. Because a predetermined number of the pre-designed channel estimators exist according to the velocities of the mobile station, a specific channel estimator to be used must be selected. In order to select a channel estimator, a velocity estimator for estimating the velocity of a mobile station based on a received signal is necessary. A method for implementing a velocity estimator is divided into a method using an autocorrelation function of a received signal in a time domain, and a method using Discrete Fourier Transform (DFT) in a frequency domain.

Selecting one of the two methods is a matter of design. A velocity estimator designed in the selected method is generally disposed in front of a channel estimator, and selects an estimation coefficient of the channel estimator after estimating the velocity of a mobile station. However, when the velocity estimator is arranged in front of the channel estimator, an improvement in a received signal-to-noise ratio by the channel estimator cannot be achieved. That is, in a low signal-to-noise ratio, the velocity estimator shows unsatisfactory performance in both a time domain and a frequency domain. In addition, when the velocity estimator is located in front of the channel estimator, an appropriate input to the velocity estimator does not exist during Code Division Multiple Access 2000 (CDMA2000) gated mode transmission.

SUMMARY OF THE INVENTION

It is, therefore, an object of the present invention to provide an apparatus and method for accurately estimating velocity of a mobile station irrespective of a signal-to-noise ratio and Code Division Multiple Access 2000 (CDMA2000) gated mode transmission in a mobile communication system.

It is another object of the present invention to provide an apparatus and method for efficiently performing data demodulation and decoding using correct channel estimation irrespective of the velocity of a mobile station in a mobile communication system.

To achieve the above and other objects, there is provided a base station apparatus for estimating a velocity of a mobile station in a mobile communication system. The apparatus comprises a channel estimator for receiving a signal on a radio channel from the mobile station and performing channel estimation using the received signal; and a velocity estimator for detecting a power spectrum value of the channel estimator, and providing the channel estimator with a channel estimation coefficient for use during channel estimation according to a Doppler shift frequency value of power estimated from the mobile station when the velocity of the mobile station is unchanged.

When the velocity of the mobile station changes, the velocity estimator corrects a power spectrum value for a predetermined time and provides the channel estimator with the channel estimation coefficient for use during channel estimation according to the Doppler frequency value based on the velocity of the corrected power spectrum value.

To achieve the above and other objects, there is provided a method for estimating a velocity of a mobile station in a base station of a mobile communication system, comprising the steps of receiving a signal on a radio channel from the mobile station and performing channel estimation using the received signal; and detecting a power spectrum value from the channel-estimated signal, and outputting a channel estimation coefficient for use during channel estimation according to a Doppler shift frequency value of power estimated from the mobile station when the velocity of the mobile station is unchanged.

Further, the channel estimation step comprises the step of performing, when the velocity of the mobile station changes, power correction for a predetermined time and outputting a channel estimation coefficient for use during channel estimation according to the Doppler frequency based on the velocity of the corrected power spectrum value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
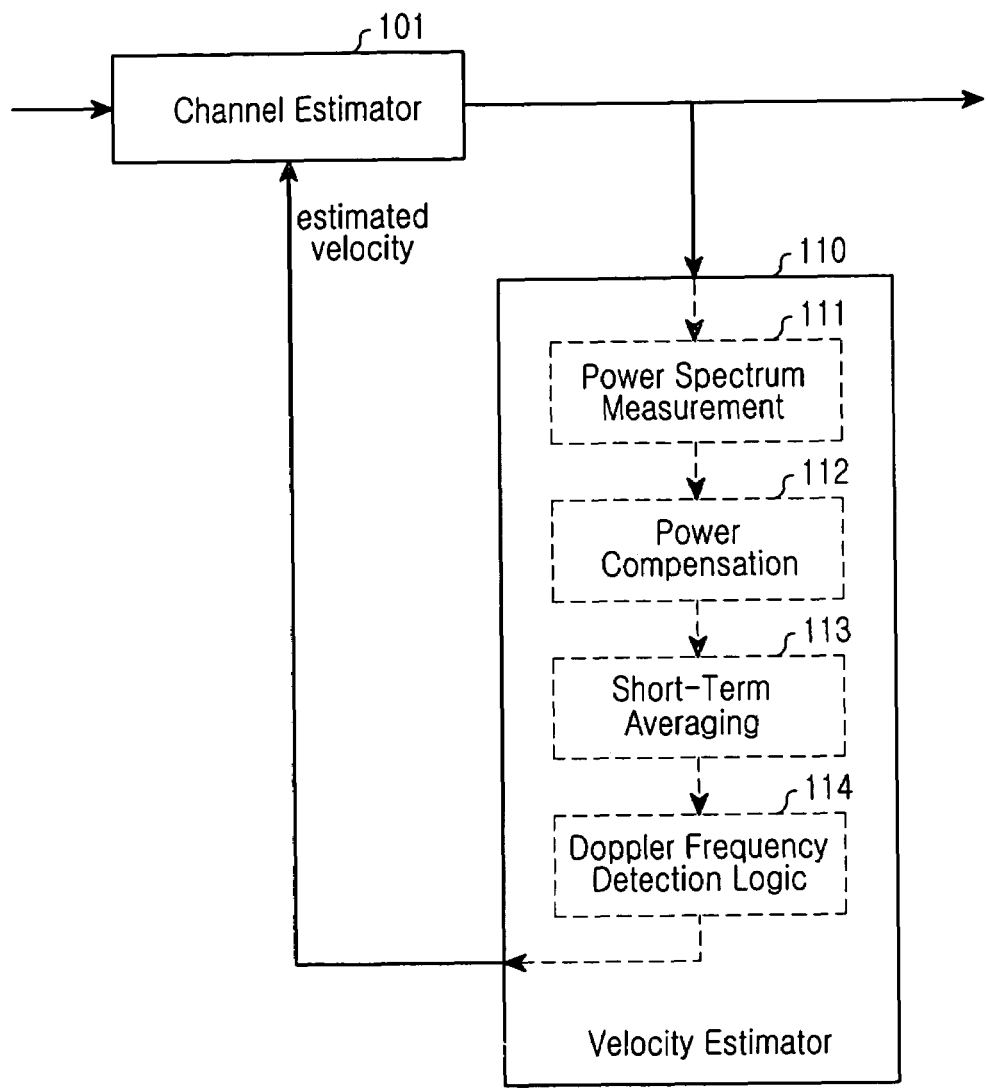
FIG. 1 is a block diagram illustrating a velocity estimator included in a base station according to an embodiment of the present invention.

An embodiment of the present invention will now be described in detail with reference to the accompanying drawings. In the drawings, the same or similar elements are denoted by the same reference numerals. In the following description, a detailed description of known functions and configurations incorporated herein has been omitted for conciseness.

FIG. 1 is a block diagram illustrating a velocity estimator included in a base station according to an embodiment of the present invention. With reference to FIG. 1, a detailed description will now be made of a structure and operation of a velocity estimator according to an embodiment of the present invention.

In FIG. 1, a channel estimator 101 and a velocity estimator 110 are illustrated, and the velocity estimator 110 is disposed at the rear of the channel estimator 101. The channel estimator 101 performs channel estimation using a signal received from a mobile station. Here, the channel estimator 101 according to an embodiment of the present invention estimates a channel using a channel estimation coefficient received from the velocity estimator 110. The channel estimation coefficient is an optimized channel estimation coefficient generated by the velocity estimator 110 according to an embodiment of the present invention to remove a Doppler shift frequency from a channel-estimated signal. In addition, a signal channel-estimated by the channel estimator 101 is input to the velocity estimator 110. Because the velocity estimator 110 estimates a velocity based on the channel-estimated signal, a signal affected by channel estimation, which is a channel-compensated signal, is a signal whose signal-to-noise ratio is improved. That is, the velocity estimator 110 detects Doppler shift using Discreet Fourier Transform (DFT) in a frequency domain using an output of the channel estimator 101 that can continuously have a value even during gated mode transmission.

Figure 2:
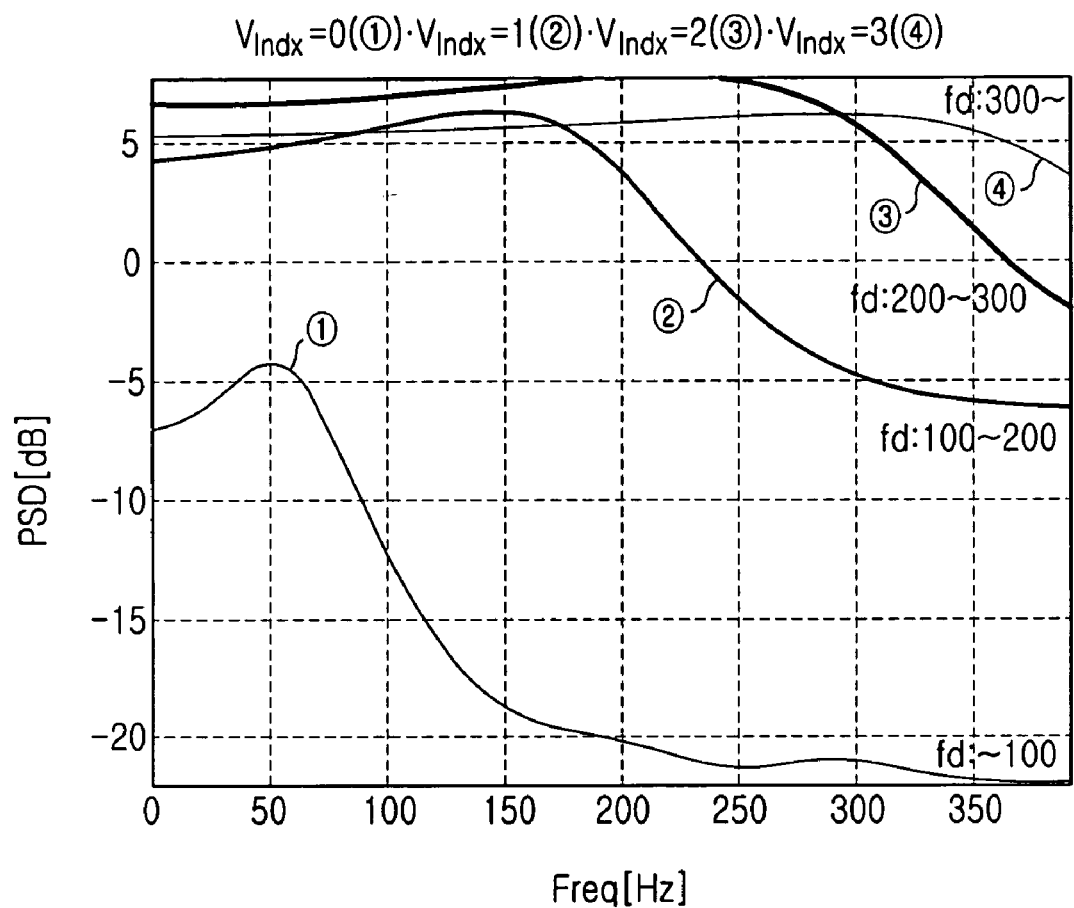
FIG. 2 is a graph illustrating power spectrums of a transfer function for the channel estimator of FIG. 1 in which the entire velocity band is divided into 4 Doppler frequency bands and the Doppler frequency bands are optimized for their own frequency bands, by way of an example.

The channel estimator 101 is distinguished according to a velocity band. That is, a plurality of channel estimators can be provided according to velocity bands, or a channel estimator can operate in different ways according to the velocity bands. In the embodiment of the present invention, it is assumed that a channel estimator operates in different ways according to velocity bands. The channel estimator 101 receives an optimized estimation coefficient for each velocity band and estimates a channel according to the received estimation coefficient. The channel estimation coefficient separates a Doppler frequency band from the entire velocity band for each velocity necessary for channel estimation. The channel estimator 101 can be designed so that it has an optimized value in a band divided for each velocity. The optimized velocity estimation coefficient in each velocity band can be designed on an off-line basis. For example, FIG. 2 illustrates power spectrums of a transfer function for a channel estimator in which the entire velocity band is divided into 4 Doppler frequency bands, and the 4 Doppler frequency bands are optimized for 0 Hz-100 Hz, 100 Hz-200 Hz, 200 Hz-300 Hz and 300 Hz or higher, respectively. The power spectrums shown in FIG. 2 become a transfer function for each Doppler frequency band.

Referring to FIG. 1, a signal output from the channel estimator 101 and then input to the velocity estimator 110 is first input to a power spectrum measurer 111. The power spectrum measurer 111 measures a power spectrum of the input signal using DFT. The power spectrum measurer 111 stores a predetermined number of channel estimation output samples among the values determined by detecting the power spectrum using DFT. Further, the power spectrum measurer 111 performs power spectrum measurement on the stored samples for a minimum number q of frequency indexes, as many as which the Doppler frequency bands can be divided. An example of the measured power spectrums is illustrated in FIG. 3.

Figure 3:
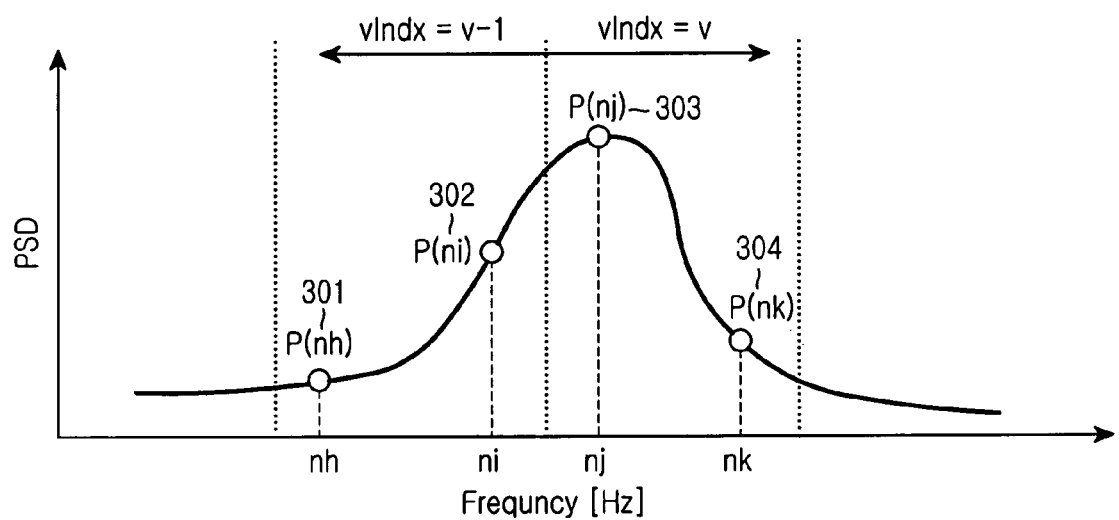
FIG. 3 is a graph illustrating an example of power spectrums measured at a predetermined number of velocity bands by the velocity estimator of FIG. 1.

FIG. 3 is a graph illustrating an example of power spectrums measured at 4 frequency indexes. In an example of FIG. 3, spectrums are measured for 4 velocity bands. Regarding the 4 frequency indexes, reference numeral 301 located in the leftmost side of the frequency axis denotes the minimum velocity, reference numeral 302 denotes the second minimum velocity, reference numeral 304 denotes the first maximum velocity, and reference numeral 303 denotes the second maximum velocity. Therefore, when frequency indexes of the velocity bands become nh, ni, nk and nj, respectively, 'h', 'i', 'k' and 'j' have a value larger than or equal to '1' and smaller than or equal to the minimum number q as many of which the Doppler frequency bands can be divided. The power spectrum values determined by measuring the power spectrums are input to a power compensator 112.

Referring to FIG. 1, the power compensator 112 compensates a power level for a power spectrum measured for each frequency index. Power compensation performed on the power spectrum by the power compensator 112 is based on the spectrum shape of the transfer function shown in FIG. 2. Doppler shift occurring according to the velocity of a mobile station shows a different attenuation in power spectrum for each frequency band while passing through the channel estimator 101. Therefore, a power spectrum measured for each frequency index has a different attenuation, so it is necessary to separately compensate for an attenuation that occurred for each frequency index ni. The power-compensated signal is input to a short-term averager 113. The short-term averager 113 calculates an average value for a predetermined short term for the input signal. Thereafter, a Doppler frequency detection logic 114 detects a Doppler frequency according to the velocity of a mobile station, sets a correction coefficient for the detected Doppler frequency, and outputs the set correction coefficient to the channel estimator 101.

Figure 4:
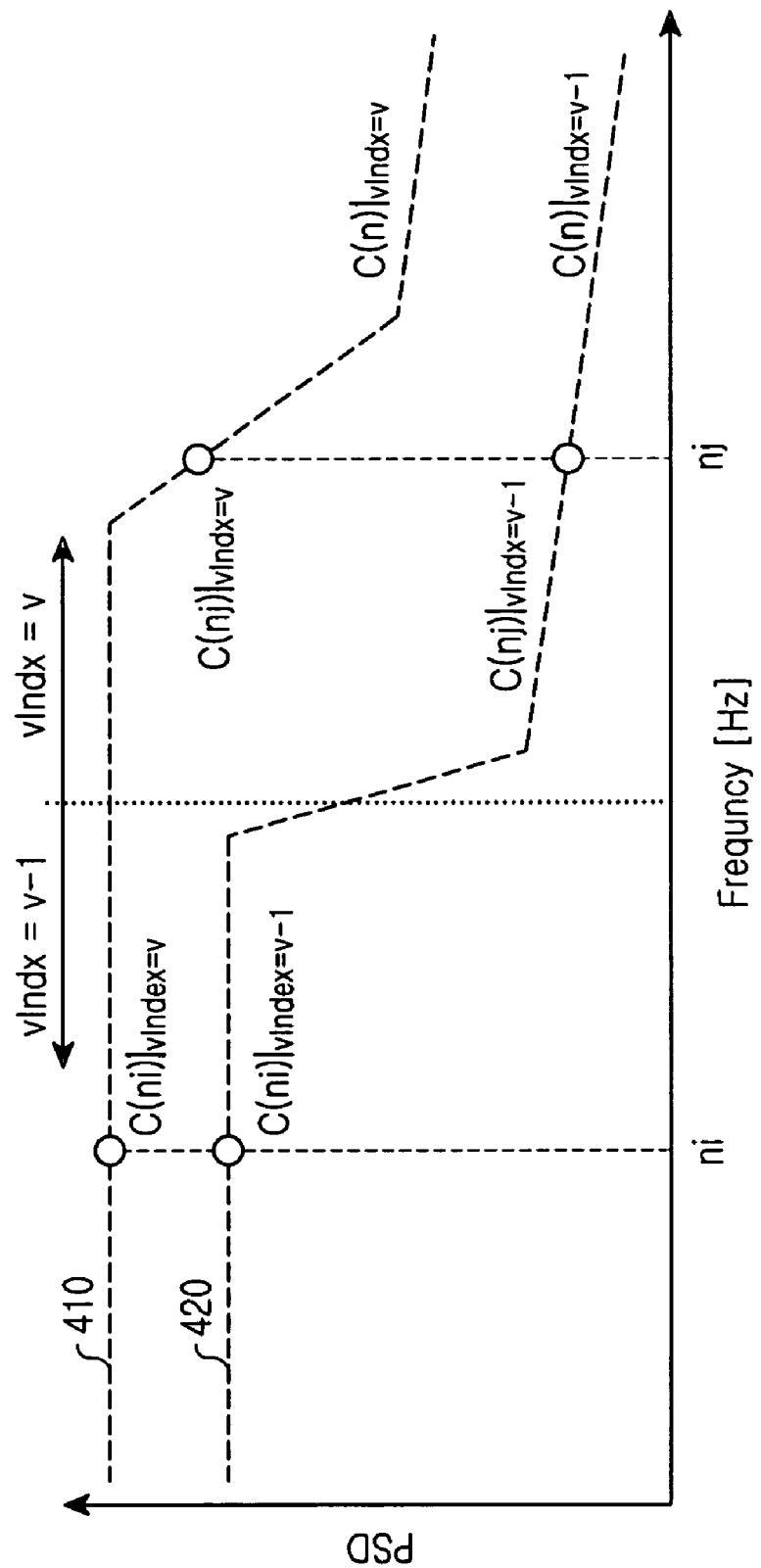
FIG. 4 is a graph illustrating spectrums of transfer functions in two channel estimators having different velocity bands.

A power compensation method will now be described with reference to FIGS. 4 to 7. FIG. 4 is a graph illustrating spectrums of transfer functions in two channel estimators having different velocity bands. If it is assumed in FIG. 4 that reference numeral 410 denotes a velocity 'v' and reference numeral 420 denotes a velocity 'v−1', a compensation value for compensating for distortion measured in the channel estimator 101 and distortion measured in the power spectrum measurer 111 in each of frequency indexes ni and nj can be calculated by multiplying a final distortion value by a reciprocal of a normalized power spectrum value. A correction term $W_{inv}(n)$ which is a reciprocal of the normalized power spectrum value can be expressed as $$W_{inv}(n)\Big|_{vIndx=v} = \frac{C\max|_{vIndx=v}}{C(n)|_{vIndx=v}}, n = n1 \sim nq \quad (1)$$

In Equation (1), $C(n)|_{vIndex=v}$ denotes a power spectrum 410 of the channel estimator 101, and $C(n)|_{vIndex=v-1}$ denotes a power spectrum 420 of the channel estimator 101. Further, in Equation (1), a power spectrum of the channel estimator 101 is converted into a power spectrum $P_w(n)$ corrected by multiplying a correction term $W_{inv}(n)$ which is a reciprocal of the normalized power spectrum value by a weight. Moreover, in Equation (1), a normalization coefficient or a maximum value $C_{max}$ of a channel estimation power spectrum can be calculated by Equation (2) or Equation (3) below.

$$C_{max}|_{vIndx=v} = \max\{C(n)|_{vIndx=v}\}, n=n1\sim nq \quad (2)$$

$$C_{max}|_{vIndx=v} = \max\{C(n)|_{vIndx=1}, C(n)|_{vIndx=2}, \ldots, C(n)|_{vIndx=M_{vel}}\}, n=n1\sim nq \quad (3)$$

Figure 5:
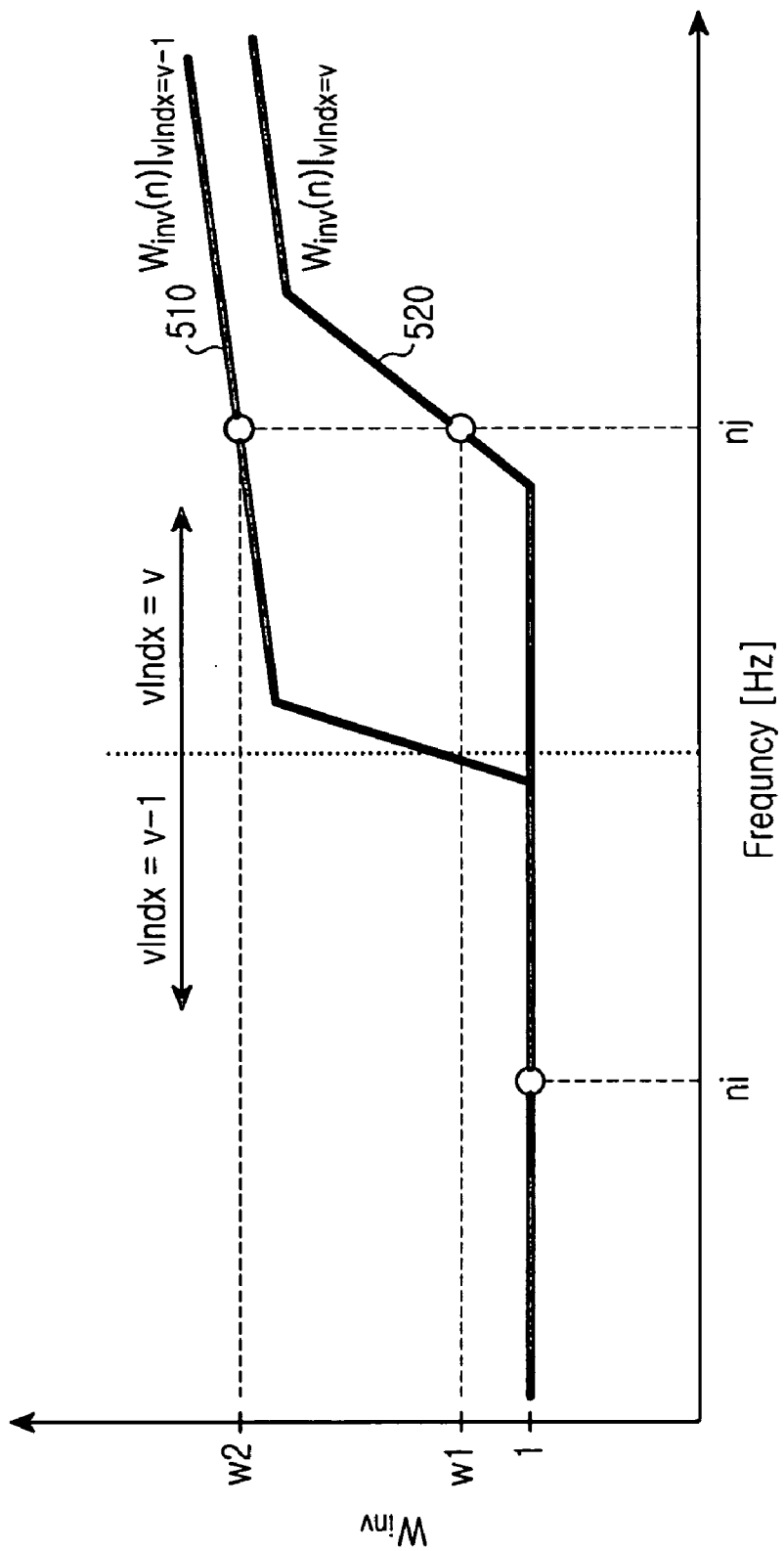
FIG. 5 is a graph illustrating correction terms used when a power spectrum of the channel estimator in FIG. 1 is calculated using Equation (2)
Figure 6:
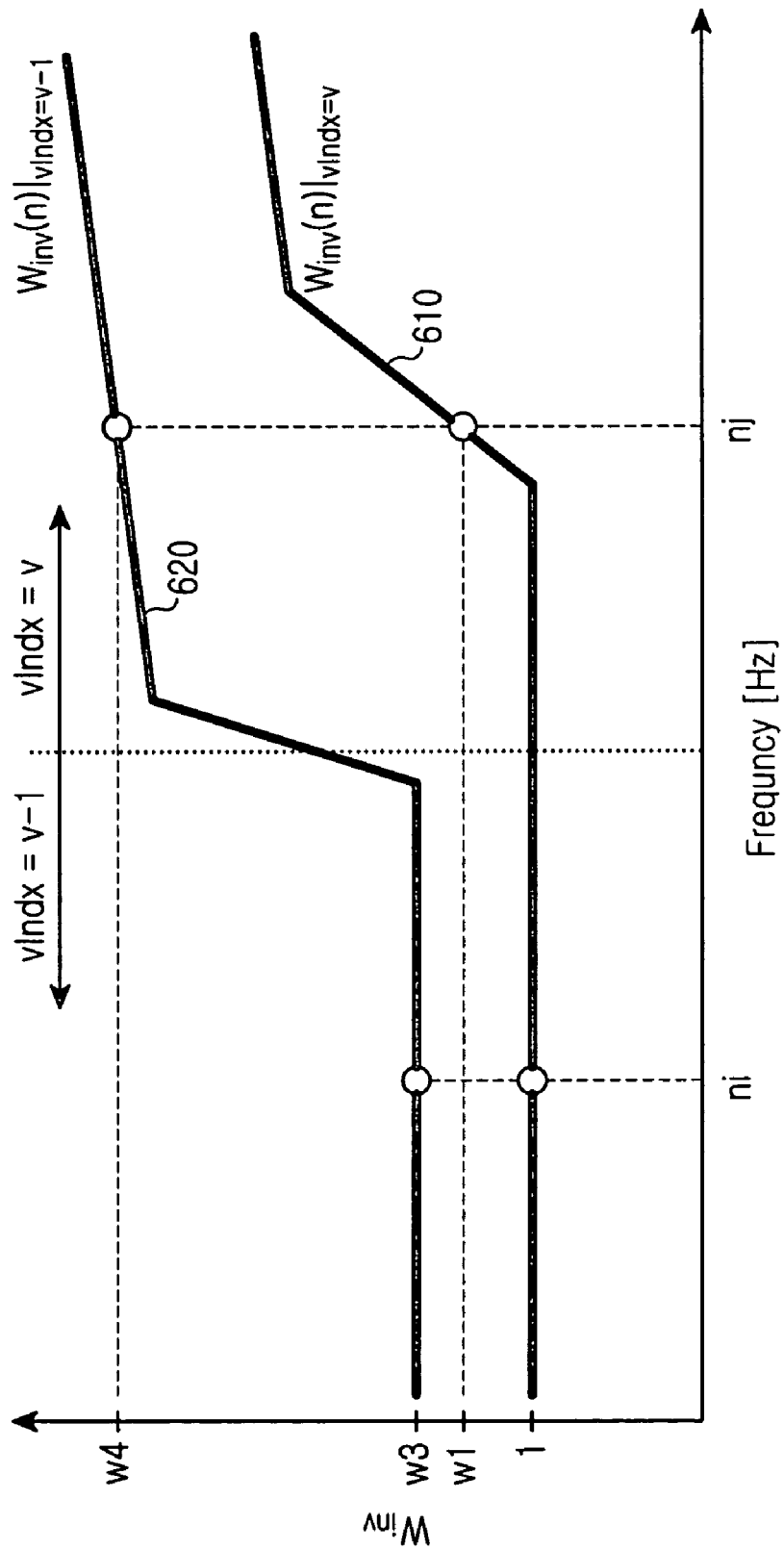
FIG. 6 is a graph illustrating correction terms used when a power spectrum of the channel estimator in FIG. 1 is calculated using Equation (3)

Equation (2) represents a method for calculating a maximum value of a power spectrum for each velocity band, and Equation (3) represents a method for calculating maximum values of power spectrums for all velocity bands and uniformly applying them. When Equation (2) and Equation (3) are used, a correction term $W_{inv}(n)$ for the channel estimation power spectrum of FIG. 4 can be obtained as shown in FIGS. 5 and 6. In FIGS. 5 and 6, reference numerals 510 and 610 denote correction terms for the velocity 'v', and reference numerals 520 and 620 denote correction terms for the velocity 'v−1'.

After the correction term $W_{inv}(n)$ is calculated using Equation (2), if a velocity band changes, a specific time noise can be present in the power spectrum measurement and correction results due to an abrupt change of the correction term. Therefore, an appropriate control operation is required. That is, a mobile station does not maintain a constant velocity but may be subject to incessant change in velocity. With reference to FIG. 5, a description will now be made of an operation performed when the velocity of a mobile station changes from 'v−1' to 'v'.

In FIG. 5, when velocity of a mobile station changes from 'v−1' to 'v', a correction term $W_{inv}(n)|_{vIndx=v-1}$ before the change of velocity is represented by a curve 510. In this case, if a frequency index is 'i', the correction term has a value of $W_{inv}(ni)=1$, and if a frequency index is 'j', the correction term has a value of $W_{inv}(nj)=w2$. Therefore, power corrected at a time 'i' has a relationship of $P_w(ni)=P(ni)$, while power corrected at a time 'j' has a relationship of $P_w(nj)=w2 \times P(nj)$. At this point, in order for the velocity of a mobile station to change to 'v', a relationship of $P_w(ni) < P_w(nj)$, i.e., $P_w(ni)/P_w(nj) < w2$, must be satisfied.

Figure 7:
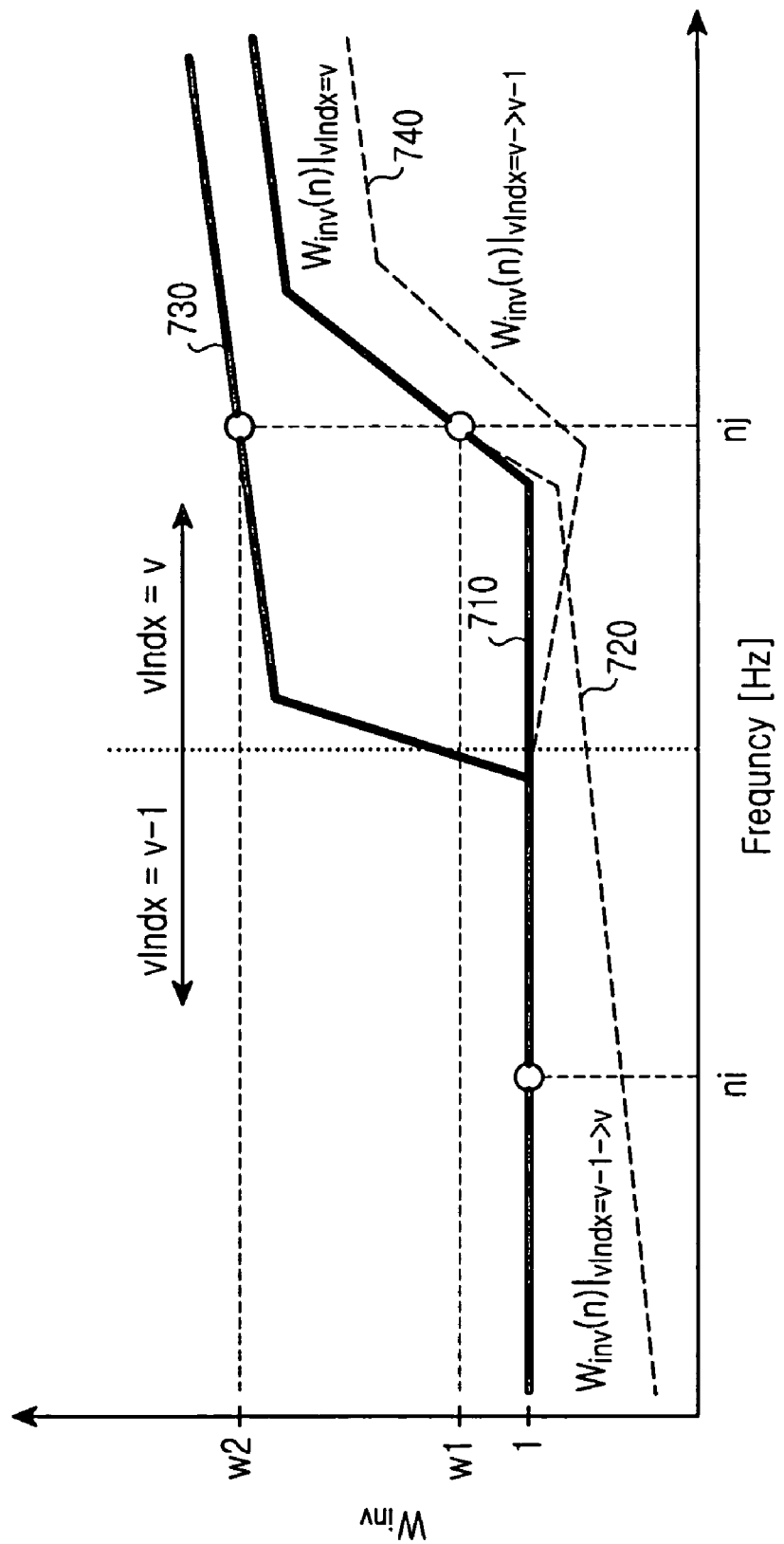
FIG. 7 is a transient correction term spectrum graph for correcting a Doppler spectrum estimated from a mobile station when the velocity changes from a low speed to a high speed or from a high speed to a low speed.

In such a case where the above relationship is satisfied, if the velocity of a mobile station changes to 'v', the correction term changes to $W_{inv}(n)|_{vIndx=v}$ represented by a curve 520, and corrected power spectrums observed at the moment of the change in the correction term abruptly change to $P_w(ni)=P(ni)$ and $P_w(nj)=w1 \times P(nj)$. In an example of FIG. 5, because w1<w2, the velocity estimator 110 repeats a velocity detection process for vIndx=v−1. In contrast, when velocity of a mobile station changes from vIndx=v to vIndx=v−1 in FIG. 5, a correction term $W_{inv}(n)|_{vIndx=v}$ before the change of velocity is represented by a curve 520. At this point, because $W_{inv}(ni)=1$ and $W_{inv}(nj)=w1$, the corrected power spectrums have values of $P_w(ni)=P(ni)$ and $P_w(nj)=w1 \times P(nj)$. For the change to vIndx=v−1, a relationship of $P_w(ni)>P_w(nj)$, i.e., $P_w(ni)/P_w(nj)>w1$, must be satisfied. If this relationship is satisfied due to the change to vIndx=v−1, the correction term changes to $W_{inv}(n)|_{vIndx=v-1}$ represented by the curve 510, and corrected power spectrums observed at the moment of the change in the correction term abruptly change to $P_w(ni)=P(ni)$ and $P_w(nj)=w2 \times P(nj)$. In an example of FIG. 5, because w1<w2, the velocity estimator 110 repeats a velocity detection process for vIndx=v. In order to remove an effect of the abrupt change in the correction term $W_{inv}(n)$ at a time when a channel estimation coefficient changes, two types of correction terms $W_{inv}(n)$ can be introduced, as shown in FIG. 7. FIG. 7 is a Doppler graph for correcting the velocity of a mobile station when the velocity changes from a low speed to a high speed or from a high speed to a low speed.

When the velocity changes from vIndx=v−1 to vIndx=v, a correction term uses a curve 730 at vIndx=v−1, and a transient correction term where $P_w(ni)$ is reduced by w1/w2 for a predetermined time uses a curve 720 at vIndx=v. After a lapse of a predetermined time, the transient correction term changes to a normal-state correction term represented by a curve 710 for power correction. In contrast, when the velocity changes from vIndx=v to vIndx=v−1, a correction term uses the curve 710 at vIndx=v, and a transient correction term where $P_w(nj)$ is reduced by w1/w2 for a predetermined time uses a curve 740 at vIndx=v−1. After a lapse of a predetermined time, the transient correction term changes to a normal-state correction term represented by the curve 730 for power correction.

Figure 8:
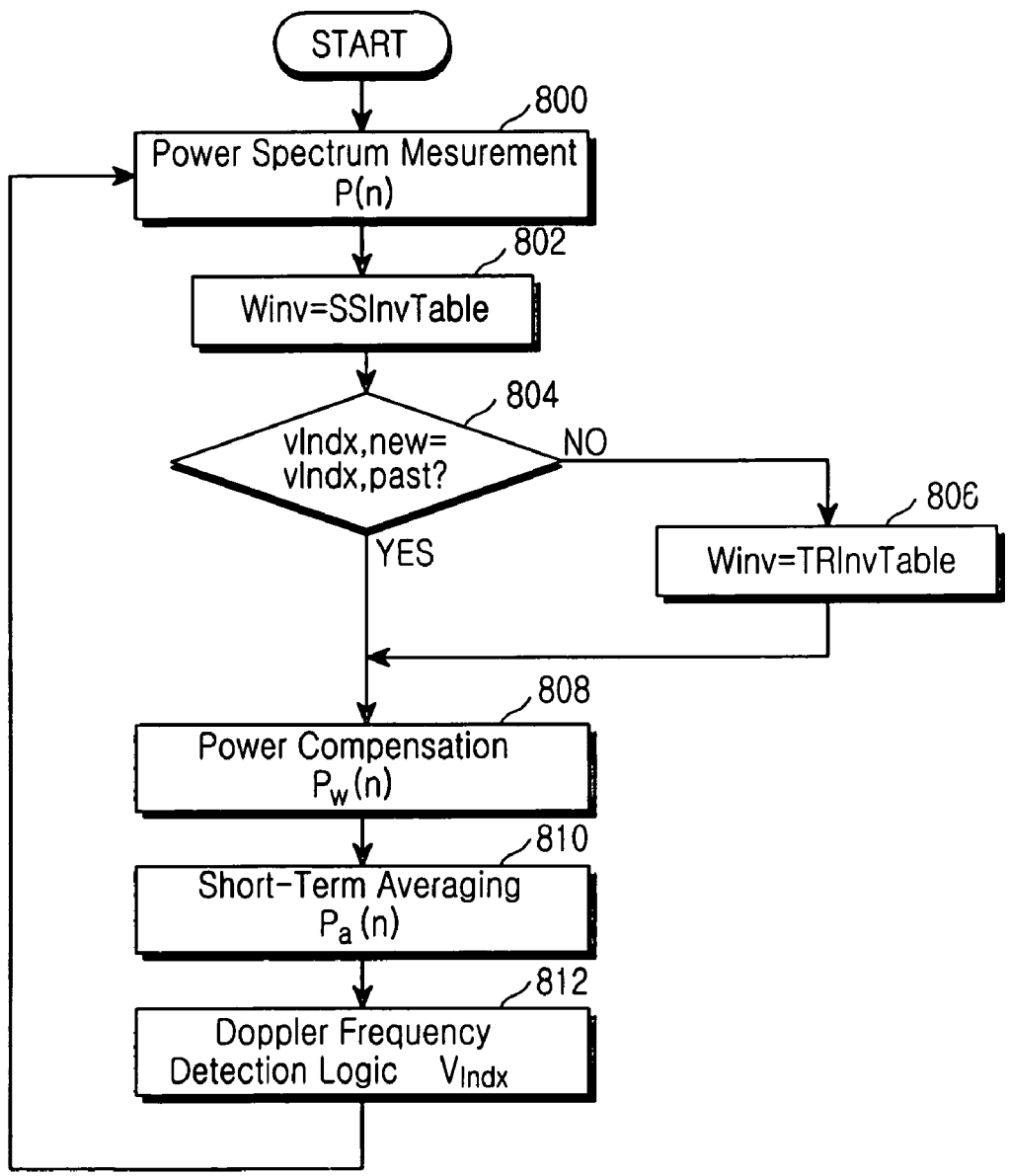
FIG. 8 is a flowchart illustrating a procedure performed in a velocity estimator using a transient correction term and a normal-state correction term according to an embodiment of the present invention.

FIG. 8 is a flowchart illustrating a procedure performed in a velocity estimator using a transient correction term and a normal-state correction term. With reference to FIG. 8, a detailed description will now be made of a procedure performed in a velocity estimator using a transient correction term and a normal-state correction term.

In step 800, the velocity estimator 110 measures a power spectrum value P(n). After the power spectrum measurement, the velocity estimator 110 proceeds to step 802 where it performs a process in a normal sate. Here, the 'normal state' refers to a state in which an estimated velocity band is kept without being changed. When the estimated velocity of a mobile station is unchanged as stated above, the velocity estimator 110 uses a Winv=SSinvTable value, or a normal-state correction term. After performing a calculation using the normal-state correction term in step 802, the velocity estimator 110 proceeds to step 804 where it determines whether a currently estimated mobile station's velocity is identical to a previous mobile station's velocity. If it is determined in step 804 that a new velocity band is detected from a signal received from the mobile station, i.e., if a current velocity is different from a previous velocity, the velocity estimator 110 proceeds to step 806. However, if it is determined in step 804 that a new velocity band is not detected, the velocity estimator 110 proceeds to step 808.

In step 806, the velocity estimator 110 uses a transient correction term according to the newly measured velocity to prevent an abrupt change of the velocity. A correction term $W_{inv}(n)$ for the velocity is calculated using Equation (3). When a correction term is calculated using Equation (3), the correction term is calculated after all velocity bands are normalized. As a result, noise generated due to an abrupt change of a correction term does not occur. However, in this case, a transient response is generated in a power spectrum measurement process due to a reverberation response of a channel estimator caused by a change in an estimation coefficient of the channel estimator 101. Therefore, the velocity estimator 110 defers the velocity estimation update by simply using a transmission count transCount for a predetermined time from the time when the velocity changes.

When the correction term is not used, i.e., when the velocity estimator 110 proceeds from step 804 to step 808, the velocity estimator 110 performs power compensation in step 808. Such power compensation is performed by the power compensator 112 of FIG. 1. Thereafter, in step 810, the short-term averager 113 of the velocity estimator 110 calculates an average of power compensated values for a predetermined short term. Through such an averaging process for a short term, a smoothed power spectrum $P_a(n)$ (where n=n1-nq) is obtained. In step 812, the Doppler frequency detection logic 114 of the velocity estimator 110 detects a Doppler frequency for the averaged power. That is, the Doppler frequency detector 114 finally compares levels of the $P_a(n)$ (where n=n1-nq) for the respective frequency indexes. If a frequency index having the largest power spectrum is detected, the Doppler frequency detector 114 sets the velocity of the mobile station to a Doppler frequency band to which the detected frequency index belongs, i.e., a velocity band corresponding to the detected frequency index. If a Doppler frequency is detected in this way, the detected Doppler frequency value is output to the channel estimator 101 so that it is updated into a channel estimation coefficient according to the Doppler frequency detected during channel estimation.

Figure 9:
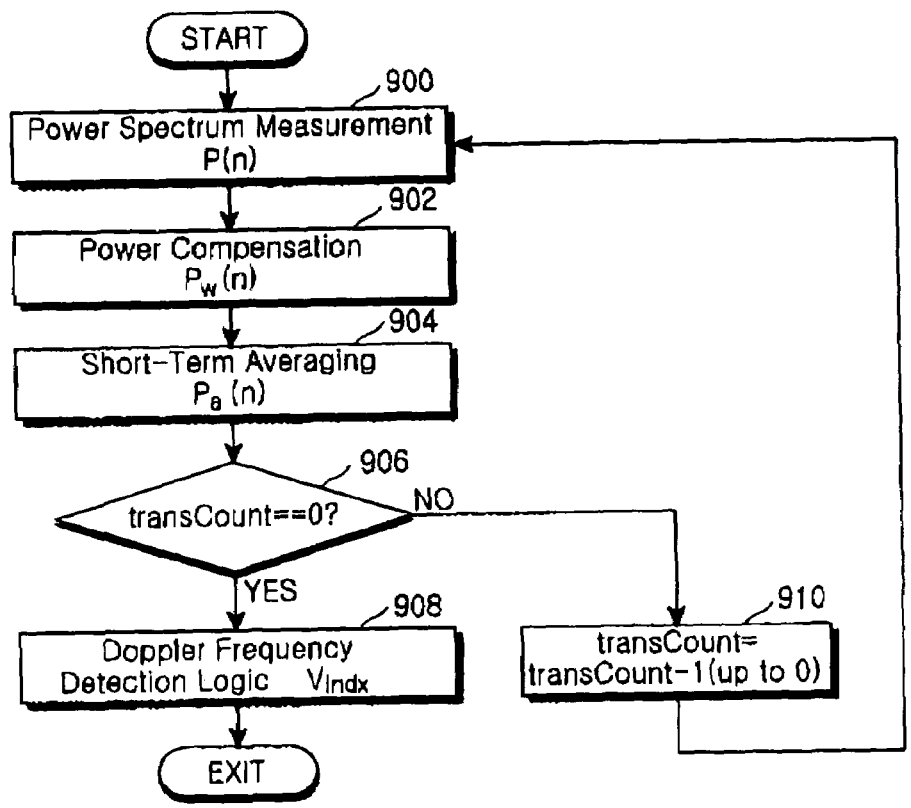
FIG. 9 is a flowchart illustrating a procedure for deferring a velocity estimation update for a transmission velocity according to an embodiment of the present invention.

FIG. 9 is a flowchart illustrating a procedure for deferring a velocity estimation update for a transmission velocity according to an embodiment of the present invention. With reference to FIG. 9, a detailed description will now be made of a procedure for deferring the velocity estimation update for a transmission velocity. It will be assumed herein that a timer value required when the velocity estimation update is deferred was set.

In step 900, the velocity estimator 110 measures a power spectrum value P(n) in this manner. Because the procedure of FIG. 9 is a control process performed in a transient state where the velocity estimation update is deferred according to the velocity, the velocity estimator 110 immediately proceeds to step 902 after step 900. Therefore, the power compensator 112 of the velocity estimator 110 performs power compensation on the measured power spectrum. After performing power compensation on the measured power spectrum, the velocity estimator 110 proceeds to step 904 where the short-term averager 113 averages the compensated power values, i.e., calculates a smoothed power spectrum $P_a(n)$ (where n=n1-nq) for a velocity value. After calculating the smoothed power spectrum value, the velocity estimator 110 determines in step 906 whether a transmission count transCount has a value of '0'. The process of determining whether a transmission count transCount has a value of '0' is equivalent to a process of determining whether a time to use a correction term according to a change in velocity has elapsed. If the time to use a correction term has expired, i.e., when the correction term is no longer used, the velocity estimator 110 proceeds to step 908 where it detects a Doppler frequency and applies a value of the detected Doppler frequency to the channel estimator 101 for channel estimation.

However, when the correction term should be continuously used, i.e., a time to use a correction term has not passed yet, the velocity estimator 110 proceeds to step 910 where it decreases the transmission count transCount. Thereafter, the velocity estimator 110 returns to step 900. That is, the velocity estimator 110 can continuously use the correction term for a time period when a correction term should be used due to a change in velocity of a mobile station.

As described above, it is possible to improve the performance of a channel estimator by using a previously normalized correction term for a predetermined time in order to prevent deterioration in reception performance due to a change in velocity of a mobile station.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A base station apparatus for estimating a velocity of a mobile station in a mobile communication system, comprising:
a channel estimator for receiving a signal on a radio channel from the mobile station and performing channel estimation using the received signal; and
a velocity estimator for detecting a power spectrum value of the channel-estimated signal outputted from the channel estimator, and providing the channel estimator with a channel estimation coefficient for use during channel estimation according to a Doppler shift frequency value estimated from the mobile station when the velocity of the mobile station is unchanged.

2. The base station apparatus of claim 1, wherein when the velocity of the mobile station changes, the velocity estimator corrects, a power spectrum value for a predetermined time and provides the channel estimator with a channel estimation coefficient for use during channel estimation according to a Doppler frequency value based on the velocity of the corrected power spectrum value.

3. The base station apparatus of claim 1, wherein the velocity estimator comprises:
a power spectrum measurer for measuring a power spectrum according to an output value of the channel estimator;
a power compensator for power-compensating an output value of the power spectrum measurer with at least one of a correction value and a normal-state value according to whether the velocity of the mobile station changes;
an averager for averaging power values output from the power compensator for a predetermined time; and
a Doppler frequency detector for detecting a Doppler frequency according to an output of the averager and outputting a correction value for use during channel estimation according to the detected Doppler frequency.

4. The base station apparatus of claim 3, wherein the value compensated for by the power compensator is a value normalized by a maximum value of a transfer function of the channel estimator, given in the following equation $C_{max}|_{vIndx=v} = \max\{C(n)|_{vIndx=v}\}, n=n1 \sim nq.$ 5. The base station apparatus of claim 3, wherein the Doppler frequency detector calculates a reciprocal of a correction value of a transfer function of the channel estimator for each velocity band in order to correct a Doppler power spectrum based on a channel estimation coefficient used during channel estimation according to the Doppler frequency.

6. The base station apparatus of claim 1, wherein the velocity estimator performs calculation on only a frequency index for each of a predetermined number of frequency bands using discrete Fourier transform (DFT).

7. A method for estimating a velocity of a mobile station in a base station of a mobile communication system, comprising the steps of:
receiving a signal on a radio channel from the mobile station and performing channel estimation using the received signal; and
detecting a power spectrum value from the channel-estimated signal, and outputting a channel estimation coefficient for use during channel estimation according to a Doppler shift frequency value estimated from the mobile station when the velocity of the mobile station is unchanged.

8. The method of claim 7, wherein when the velocity of the mobile station changes, the channel estimation step further comprises the step of performing power spectrum value correction for a predetermined time and outputting a channel estimation coefficient for use during channel estimation according to a Doppler frequency based on the velocity from the corrected power spectrum value.

9. The method of claim 7, wherein the velocity estimation step comprises the steps of:
measuring a power spectrum of the channel-estimated power;
power-compensating the measured power spectrum with at least one of a correction value and a normal-state value according to whether the velocity of the mobile station changes;
receiving the power-compensated values and averaging the power-compensated values for a predetermined time; and
detecting a Doppler frequency according to the averaged value and outputting a correction value for use during channel estimation according to the detected Doppler frequency.

10. The method of claim 8, wherein the value compensated during power compensation is a value normalized by a maximum value of a transfer function of a channel estimator, given in the following equation $C_{max}|_{vIndx=v} = \max\{C(n)|_{vIndx=v}\}, n=n1 \sim nq.$ 11. The method of claim 7, wherein a reciprocal of a correction value of a transfer function of a channel estimator is calculated for each velocity band in order to correct a Doppler power spectrum based on a channel estimation coefficient for use during channel estimation according to the Doppler frequency.

12. The method of claim 7, wherein the velocity estimation step comprises the step of performing calculation on only a frequency index for each of a predetermined number of frequency bands using discrete Fourier transform (DFT).

* * * * *